US009135763B2

(12) United States Patent
Gupta (10) Patent No.: US 9,135,763 B2
(45) Date of Patent: Sep. 15, 2015

(54) SYSTEM AND METHOD FOR WIRELESS STATE IDENTIFICATION

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1107 days.

(21) Appl. No.: 12/004,155

(22) Filed: Dec. 19, 2007

(65) Prior Publication Data

US 2009/0164798 A1    Jun. 25, 2009

(51) Int. Cl.

| | | |
|---|---|---|
| *G06F 7/04* | (2006.01) | |
| *G06F 7/00* | (2006.01) | |
| *G07C 9/00* | (2006.01) | |
| G07B 15/00 | (2011.01) | |
| G06F 21/34 | (2013.01) | |
| H04L 9/32 | (2006.01) | |
| G06F 21/83 | (2013.01) | |
| G06F 21/32 | (2013.01) | |

(52) U.S. Cl.
CPC ........ *G07C 9/00158* (2013.01); *G07C 9/00166* (2013.01); *G06F 21/32* (2013.01); *G06F 21/34* (2013.01); *G06F 21/83* (2013.01); *G06F 2221/2115* (2013.01); *G07B 15/00* (2013.01); *H04L 9/3231* (2013.01); *H04L 9/3249* (2013.01); *H04L 2209/56* (2013.01); *H04L 2209/88* (2013.01); *Y10S 283/904* (2013.01)

(58) Field of Classification Search
CPC ................. G07C 9/00087; G07C 2009/00095; G06Q 20/341; G06Q 20/40145; G06Q 20/3415; G07F 7/1008; G06K 19/07354; G06K 19/077; G06K 13/073; G06K 19/07739; G06K 7/0008; G06K 9/00006; G06F 21/32
USPC ........................ 340/5.8, 5.81, 5.82, 5.83, 5.86
See application file for complete search history.

(56) References Cited

U.S. PATENT DOCUMENTS

| | | | | |
|---|---|---|---|---|
| 4,582,985 | A * | 4/1986 | Lofberg | 235/380 |
| 4,993,068 | A * | 2/1991 | Piosenka et al. | 713/186 |
| 5,623,552 | A * | 4/1997 | Lane | 382/124 |
| 5,973,731 | A * | 10/1999 | Schwab | 348/161 |
| 6,595,342 | B1 * | 7/2003 | Maritzen et al. | 194/212 |
| 6,715,679 | B1 * | 4/2004 | Infosino | 235/449 |
| 6,952,164 | B2 * | 10/2005 | Junqua | 340/539.13 |
| 7,026,957 | B2 * | 4/2006 | Rubenstein | 340/988 |
| 7,039,223 | B2 * | 5/2006 | Wong | 382/124 |
| 7,123,926 | B2 * | 10/2006 | Himmelstein | 455/456.1 |
| 7,137,553 | B2 * | 11/2006 | Register et al. | 235/382.5 |
| 2004/0050930 | A1 * | 3/2004 | Rowe | 235/380 |
| 2004/0129787 | A1 * | 7/2004 | Saito et al. | 235/492 |
| 2004/0179718 | A1 * | 9/2004 | Chou | 382/115 |
| 2005/0280502 | A1 * | 12/2005 | Bell | 340/5.83 |
| 2006/0000891 | A1 * | 1/2006 | Bonalle et al. | 235/380 |
| 2006/0174352 | A1 * | 8/2006 | Thibadeau | 726/27 |
| 2009/0061933 | A1 * | 3/2009 | Lo et al. | 455/558 |

* cited by examiner

*Primary Examiner* — Ariel Balaoing
*Assistant Examiner* — John Bamert
(74) *Attorney, Agent, or Firm* — Swanson & Bratschun, L.L.C.

(57) ABSTRACT

A system and method for processing a state identifier. A request is received for a state identifier. A biometric associated with the state identifier is requested from a user. Authenticity of the biometric is verified in response to receiving the biometric from the user. The state identifier is transmitted to a receiving device in response to determining the biometric is authentic.

19 Claims, 5 Drawing Sheets

SYSTEM AND METHOD FOR WIRELESS STATE IDENTIFICATION

BACKGROUND

Federal, state, and local officials are charged with protecting the public. In performing their duties, law enforcement officials in particular face dangerous situations daily. For example, traffic stops are dangerous because a police officer or other law enforcement official may be unable to determine the intentions or disposition of the driver or passengers of a stopped vehicle without actually approaching the vehicle.

Personal identification documents such as drivers' licenses, insurance cards, passports, and other similar documentation may help identify information about the driver. However, in order to obtain some of this information, the officer may be required to approach the vehicle which is the most dangerous part of a traffic stop. These different forms of identification have not been updated as electronic mediums and computing has become more commonplace and secure. As a result, personal contact is almost always required to retrieve identification information for verification purposes. Despite some improvements in technology, law enforcement officials and others that must verify personal identification still face dangerous situations daily.

SUMMARY

One embodiment includes a system and method for processing a state identifier. A request may be received for a state identifier. A biometric associated with the state identifier may be requested from a user. Authenticity of the biometric may be verified in response to receiving the biometric from the user. The state identifier may be transmitted to a receiving device in response to determining the biometric is authentic.

Another embodiment includes a system for receiving a state identifier. The system may include a server configured to wirelessly request a state identifier from a user, and receive a state identifier linked with a user biometric released based on verification of the biometric. The system may also include a database in communication with the server. The database may be configured to verify whether the state identifier is authentic and verify information associated with the state identifier.

Yet another embodiment includes a wireless device configured to utilize a state identifier. The wireless device may include a processor for executing a set of instructions. The wireless device may also include a memory for storing the set of instructions. The set of instructions are configured to receive a request for a state identifier, request a biometric associated with the state identifier from a user, verify authenticity of the biometric in response to receiving the biometric from the user, and transmit the state identifier to a receiving device in response to verifying the biometric is authentic.

BRIEF DESCRIPTION OF THE DRAWINGS

Illustrative embodiments of the present invention are described in detail below with reference to the attached drawings, which are incorporated by reference herein and wherein.

DETAILED DESCRIPTION OF THE DRAWINGS

Illustrative embodiments provide a system and method for an electronic state identification. An electronic state identifier may be received by a user from a secure server or by using a secured process. The electronic state identifier may be downloaded to a cellular phone or other wireless device implemented by the user. The electronic state identifier is linked or associated with a biometric of the user. As a result, the electronic state identifier may be used, displayed, or transmitted to an authorized receiving party only when authorized by the user based on an authenticated biometric. The electronic state identifier may be used as a replacement for other forms of identification at government facilities, airports, during traffic stops or for law enforcement purposes, or at other times when an authenticated form of identification may be required. As a result, identification information for an individual may be retrieved from a distance decreasing the likelihood of injury to law enforcement officials and the user.

Figure 1:
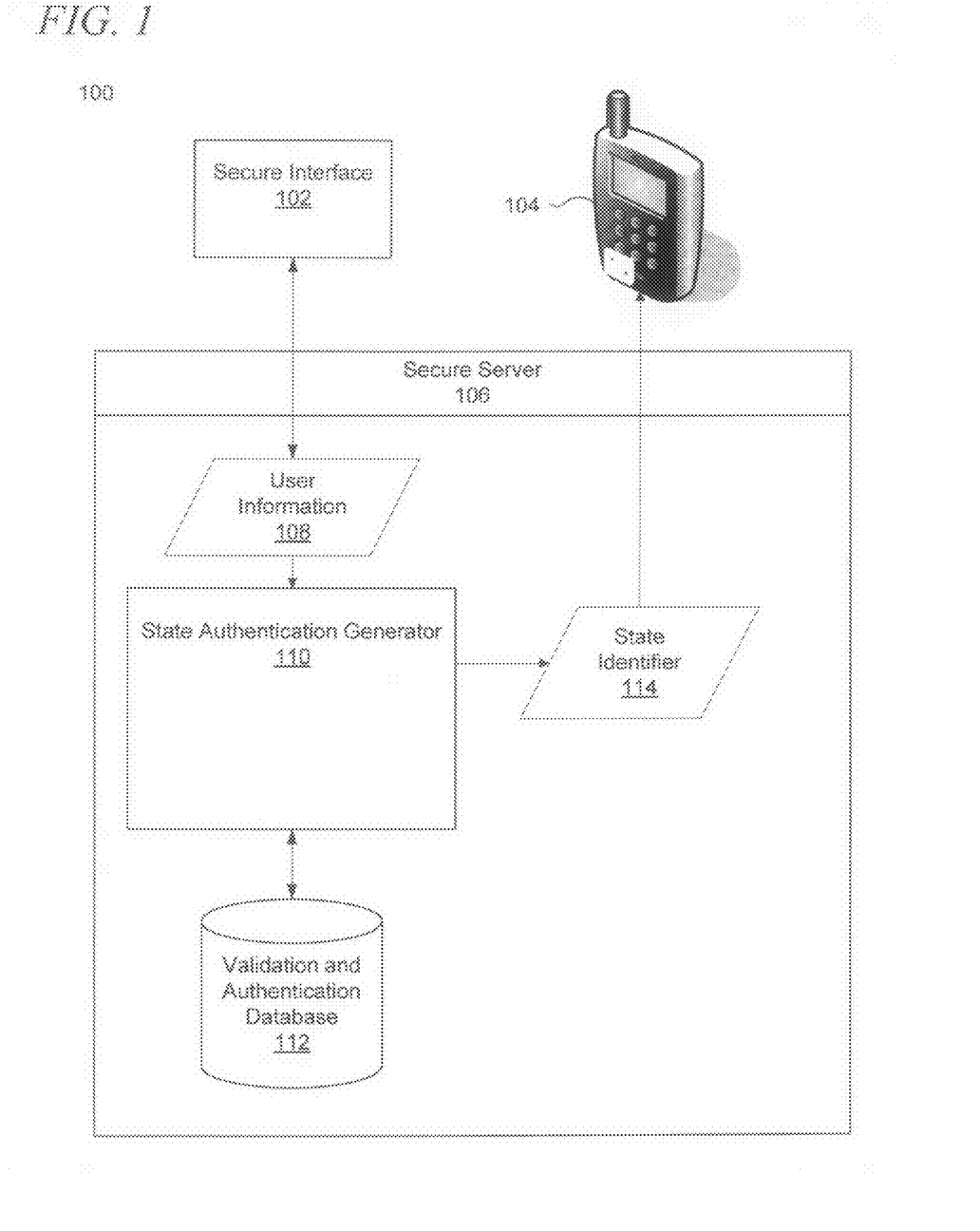
FIG. 1 is a block diagram of an identification system in accordance with an illustrative embodiment.

FIG. 1 is a block diagram of an identification system in accordance with an illustrative embodiment. FIG. 1 illustrates the different elements and components of one embodiment of an identification system 100. The identification system may include a secure interface 102, a wireless device 104, and a secure server 106. The secure server 106 may further include user information 108, a state authentication generator 110, a validation and authentication database 112, and a state identifier 114.

The secure server 106 is a computing device for processing and storing information. The secure server 106 may be used to generate the state identifier 114 or state identification from the user information 108 for subsequent transmission to and storage within the wireless device 104. The secure interface 102 may be a software application or hardware device in communication with the secure server 106 for allowing a user to provide information and feedback. In one embodiment, the secure interface 102 may be a secured web browsing application available through a governmental computer. The connection between the secure interface 102 and the secured server 106 may be a cable, fiber optic, Ethernet, wireless, or other similar communications connection. The connection may be encrypted, tunneled, or otherwise secured for protecting information passed between the secure interface 102 and the secure server 106.

In one embodiment, the secure interface 102 may be a computing device monitored by or controlled by officials charged with verifying authentication and granting the state identifier 114. The secure interface 102 may be located remotely from the secure server 106. For example, the secure server 106 may record and store information for an entire county and may be connected to multiple secure interfaces through one or more secured connections.

The secure server 106 is a computing device for generating the state identifier 114. The secure server 106 may be located in any location that allows the secure interface 102 to communicate with the secure server 106 in order to receive the user information 108 and generate the state identifier 114. In particular, the secure server 106 may be located at a secure facility or at a centralized facility monitored by one or more private and/or government organizations or agencies. The identification system 100 may be used in particular by a user seeking to receive the state identifier 114. In one example, the state identifier 114 stores information related to a driver's license, in addition to other identification information.

In one embodiment, the user may be required to access the secure interface 102 in order to provide the user information 108. For example, the secure interface 102 may be accessible only by an employee of a state or federal agency. In one example, a user may provide a driver's license, birth certificate, passport, or other information to a government employee that accesses the secure interface 102 in order to enter the user information 108 for processing by the secure server 106. In another embodiment, the secure interface 102 may be the personal computer of a user that connects to the secure server 106 through a connection such as a virtual private network (VPN), network tunnel, encrypted channel, or other secure connection.

The user information 108 is personal information about the user that verifies his or her identity and legal status. For example, the user information may include the state of residence, birth date, social security number, resident or non-resident status, criminal record, physical attributes, picture, and any other information that is or may be used by a governmental agency, organization, or business to protect and provide for citizens or other individuals of the state and nation. In one embodiment, the state identifier may also include critical medical information, such as allergies, medical conditions, contact information, guardian or parental information, blood type, DNA information, or other similar personal information that a person may voluntarily select to include in the state identifier.

The user information 108 may be entered manually through the secure interface 102 using a keyboard, mouse, touch screen, voice recognition software, or other user interface elements. Alternatively, the secure interface 102 may be scanned and converted into the user information 108 from drivers' licenses, birth certificates, passports, or other documentation. The user information 108 may be in an electronic format, such as file, electronic document, fields, instructions, or other data format when received by the secure server 106.

In one embodiment, the state authentication generator 110 is an application or software module within the secure server 106 dedicated to generating the state identifier 114. However, the state authentication generator 110 may be any hardware or software element suitable for using the user information 108 to generate the state identifier 114. In particular, the state authentication generator 110 may be configured to receive the user information 108 and verify the user information using the validation and authentication database 112. Additionally, the state and authentication generator 110 may use logic and other available information to determine whether the user information provided through the secure interface 102 is correct, valid, and properly identifies the user applying for the state identifier 114.

The state authentication generator 110 may determine whether the user is eligible or qualifies to receive the state identifier 114. The state authentication generator may use any number of criteria based on laws, regulations, and other logic to determine whether the user is eligible to receive the state identifier. The logic may include verifying a picture, using facial recognition, using voice recognition, or retrieving and analyzing fingerprint or other biometrics and information from the user to determine whether the state identifier 114 may be created for the user.

The validation and authentication database 112 stores records and information used to validate the user information 108. For example, the validation and authentication database 112 may include any number of federal and state databases including criminal records, social security information, alien status, school records, and other information that is commonly and legally tracked by the federal, state, and local government. Additionally, the validation and authentication database 112 may access other programs, databases or information that are used or tracked by private companies, agencies, or organizations for verifying information about an individual.

The state identifier 114 is a file, program, instructions, or other electronic information that identifies the user. The state identifier 114 may include a picture, social security number, physical description, criminal record, tickets, citations, citizenship status, and the other relevant information as previously discussed. The state identifier 114 may be encrypted or password protected in addition to the biometric protection and authentication required by wireless device 104. As a result, the state identifier 114 may have numerous forms of security preventing access or transmission from the wireless device 104 to an unauthorized user or access of the state identifier 114 by someone that comes into possession of the wireless device 104 without the permission or knowledge of the user.

The wireless device 104 is an electronic device enabled for wireless communication. In one embodiment, the wireless device 104 is a cell phone, communications enabled mp3 player, PDA, or other similar device. However, the wireless device 104 may be any device suitable for storing the state identifier 114 and transmitting the state identifier 114 to an authorized party when requested.

The wireless device 104 may communicate with various types of wireless networks. In one embodiment, the wireless device 104 may communicate through a transmission tower using communications protocols, such as time division multiple access (IDMA), code division multiple access (CDMA), global systems for mobile (GSM) communications, personal communications systems (PCS), WLAN, WiMAX or other frequently used cellular and data communications protocols and standards.

The wireless device 104 may also be enabled to communicate by using a short range radio frequency, such as WiFi® or Bluetooth®. In one embodiment, the wireless device 104 may communicate with the secure server 106 or an authorized receiving party, such as a police officer, through a low-power radio frequency, such as Bluetooth. However, any short range or low-power data signals may be employed to communicate information and, in particular, send and receive the state identifier 114. For example, the 4.9 GHz frequency is being deployed by numerous municipalities for emergency use and may be implemented by the wireless device 104 to communicate with authorized personnel.

Figure 2:
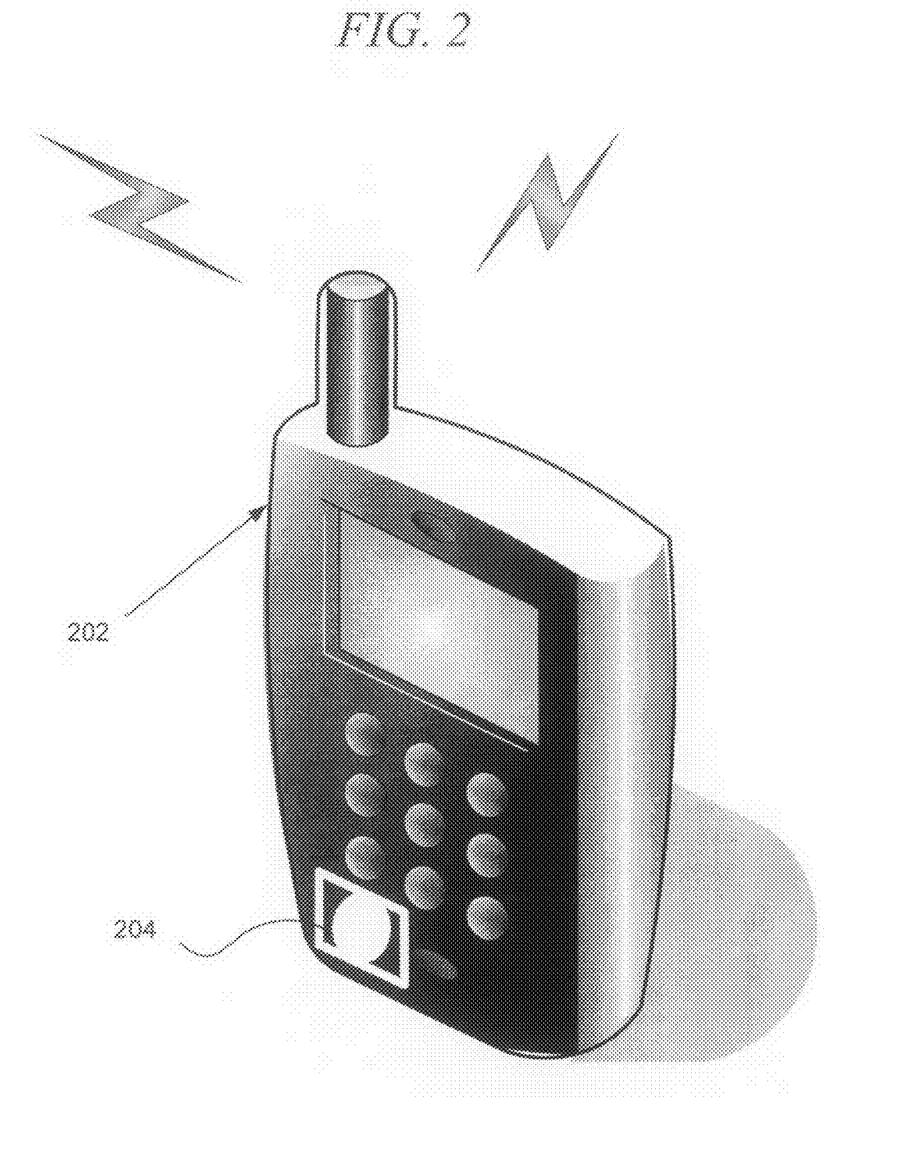
FIG. 2 is a perspective view of a wireless device configured for biometric verification in accordance with an illustrative embodiment.

FIG. 2 is a perspective view of a wireless device configured for biometric verification in accordance with an illustrative embodiment. FIG. 2 includes the wireless device 202. The wireless device 202 is a particular implementation of the wireless device 204 of FIG. 2. As previously described, the wireless device 202 may be any type of wireless device. As shown, the wireless device 202 is embodied as a wireless telephone. However, the wireless device may be any device suitable for storing the state identifier and wirelessly transmitting the state identifier to an authorized receiving party. The wireless device 202 includes a biometric reader 204.

The biometric reader 204 is a device configured to receive a biometric from a user and determine whether the biometric is from an authorized user of the wireless device 202. The biometric reader 204 may also be used to associate a state identification with a particular user of the wireless device 202. For example, the mother of a family may associate her state identifier with her thumbprint to ensure that her state identifier is used only with her authorization. The wireless device 202 may require that the wireless device 202 associates the biometric with the state identifier immediately upon downloading the state identification to the wireless device 202. In one embodiment, the association may never be changed. In another embodiment, the association between the state identifier and the biometric may be changed only when the wireless device 202 is communication with a secure server or as otherwise authorized.

In one embodiment, the biometric reader 204 is a fingerprint scanner configured to allow the user to press a thumb or finger against the biometric reader 204 in order to scan the fingerprint of the user. The fingerprint or biometric is used to verify that the user is authorized to access the state identification stored in the wireless device or accessible through the wireless device 202. In another embodiment, the biometric reader 204 is a retinal scanner used to scan the iris of the eye to determine whether the user is authorized to access the wireless device 202. The biometric reader 204 may also be a DNA analysis device for quickly analyzing the DNA of the user. Alternatively, the biometric reader may include a camera or microphone for facial or voice recognition of the user. The configuration of the biometric reader 204 is structured to operate with the standard features and functions of the wireless device 202.

In one embodiment, the biometric reader 204 may be used only when the user needs access to the state identifier and during the rest of the time is a passive element of the wireless device 202. In another embodiment, the biometric reader 204 may incorporate a combination of biometric devices so that when the state identification is ready to be transmitted, the user may be required to submit two different forms of biometrics for enhanced security and authentication. The biometric reader 204 may include any number of hardware and software components.

Figure 3:
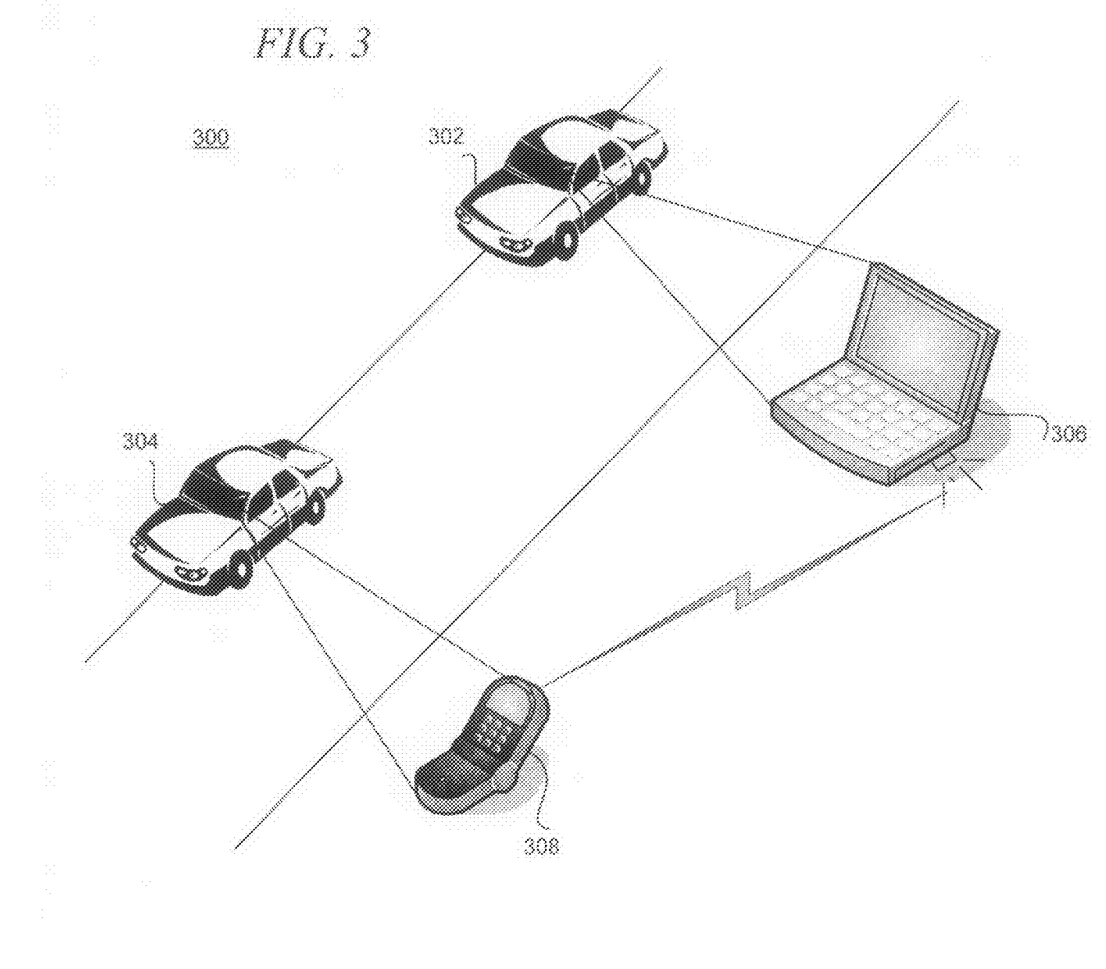
FIG. 3 is a perspective diagram of an authentication environment in accordance with an illustrative embodiment.

FIG. 3 is a perspective diagram of an authentication environment in accordance with an illustrative embodiment. FIG. 3 illustrates an authentication environment 300. The authentication environment may include any number of elements including a police car 302, a user 304, a laptop 306, and a wireless device 308. The wireless device 308 is a particular implementation of the wireless device 202 of FIG. 2. The computing device utilized within the police car 302 is shown as a laptop 306. However, the laptop 306 may also be an in-car computing system, wireless device, PDA, or other computing device suitable for communication with the wireless device 308 and/or one or more wireless networks. The laptop 306 may include any number of internally stored databases or other relevant information stored in memory.

The laptop 306 may incorporate one or more wireless transceivers for communicating with the wireless device 308 and another communications network, such as a police network used to verify background information and authenticate the state identifier. FIG. 3 presents an illustrative example of how the state identifier may be used to protect the police officer within the police car 302 and the driver or user 304 of the state identifier during a traffic stop. However, the state identifier may be used in any number of circumstances and conditions in which the user is required to provide the state identifier to an official party for purposes of identifying the user or otherwise verifying information provided by the state identifier. The state identifier may be applicable to an circumstances in which a user may be required to provide written identification or authentication materials.

In one example, the police car 302 may have pulled over the user 304 because the user 304 was driving faster than the posted speed limit. The police officer may request that the user release his or her state identifier to be read by the laptop 306. The police car 302 may do this from a distance by speaking through an amplifier or microphone, or this may be common knowledge based on the use of state identifiers during a traffic stop. For example, users of the state identifier may be instructed by law to release the state identifier for retrieval by the laptop 306 once the user is pulled over in order to verify the identity of the user 304 before the police officer will approach the user 304. In one embodiment, the laptop 306 may be programmed to transmit a universal message that will be received by the wireless device 308 informing the user to release the state identifier.

The wireless device 308 and laptop 306 may send and receive a request for the state identifier and the state identifier itself using any number of communication signals or protocols. For example, the laptop 306 may use a Bluetooth signal to request the state identifier from the wireless device 308. In another example, the laptop 306 may use a cellular protocol such as GSM, CDMA, TDMA, or other applicable wireless signals or dedicated frequencies to request the state identifier from the wireless device 308.

As previously described, the user 304 may be required to provide a biometric into the wireless device 308 before the state identifier may be released or otherwise transmitted to the laptop 306. The wireless device 308 may include a graphical interface that alerts the user 302 that the police officer within the police car 302 is requesting the state identifier before the police officer approaches the user 304. In one embodiment, the wireless device 308 may only broadcast the signal including the state identifier, within a specified range so that only the police car 302 and corresponding laptop 306 is within range to receive the state identifier.

In one embodiment, the laptop 306 and the wireless device 308 may establish a virtual private network a tunnel, encrypted connection, or other secured wireless connection link or communication with another before the state identifier may be transmitted. Similarly, various forms of electronic handshakes or authentication may be used to ensure that only the laptop 306 receives or may request the state identifier. In one embodiment, the request from the police car 302 may be date and time stamped and the wireless device 308 will only allow the state identifier to be transmitted if the time stamp is correct or has not expired. For example, the time stamp may require that a request be received within two minutes of transmission from the laptop 306 to the wireless device 308. In another embodiment, the wireless device 308 may require that a handshake occur before an encryption key is transmitted or in order to otherwise activate the state identifier.

The request from the laptop 306 may include any other identifier that establishes that the request emanating from the police car 302 is an authorized request from the police car 302 and is an authorized request and is not received from an unauthorized party. For example, once the user 304 has received the request to connect to the laptop 306 in order to broadcast the state identifier, the user 304 may be required to enter the license plate number of the police car 302 in order to establish the secured wireless link. The state identifier may require a private key from the user 304 as well as a public key. The public key may be an encryption key, password, or other authentication element that may be granted to authorized federal, state, or private organizations authorized to receive state identifiers. For example, the private key may be an answer to a pre-defined list of questions or other information that may be transmitted from the wireless device 308 to the laptop 306. As a result, the state identifier is protected at all times so that it is used only for authorized purposes of the official within the police car 302.

The police car 302 and laptop 306 are one example of a receiving device, authorized party, or authorized recipient. The receiving device is a person, individual, or organization authorized to request and receive the state identification from one or more users. Examples of receiving devices or individuals implementing or using the receiving devices may include the transportation security agency, police departments, fire departments, customs officials, border security agents, parties with the Department of Motor Vehicles, and other individuals that function in a capacity that requires them to verify identifications of a user to perform any number of services, security, or work.

In one embodiment, the state identifier transmitted from the wireless device 308 to the laptop 306 is encrypted. The laptop 306 may include an encryption key that is authorized and utilized by all official receiving devices in order to decode the state identification. In another example, the wireless device 308 may be required to send an encryption key for decrypting the state identifier to the laptop 306 separately to verify the information included in the state identifier. In particular, the state identifier may include a picture and personal information for use by the police officer. For example, the police officer may be able to find a picture of the user and verify his or her criminal background or other related information before approaching the vehicle. As a result, the police officer is able to obtain the state identification and a limited amount of information about the user 304 before approaching the user's vehicle, thereby increasing safety and protecting the police officer from any potential dangers.

The laptop 306 may be connected to any number of databases, servers, and intelligent network devices in order to verify the state identifier and otherwise determine if there are any circumstantial facts or information that the police officer should be aware of when approaching the user 304. Similarly, the laptop 306 may be integrated with or networked to other computing elements of the police car 302.

Figure 4:
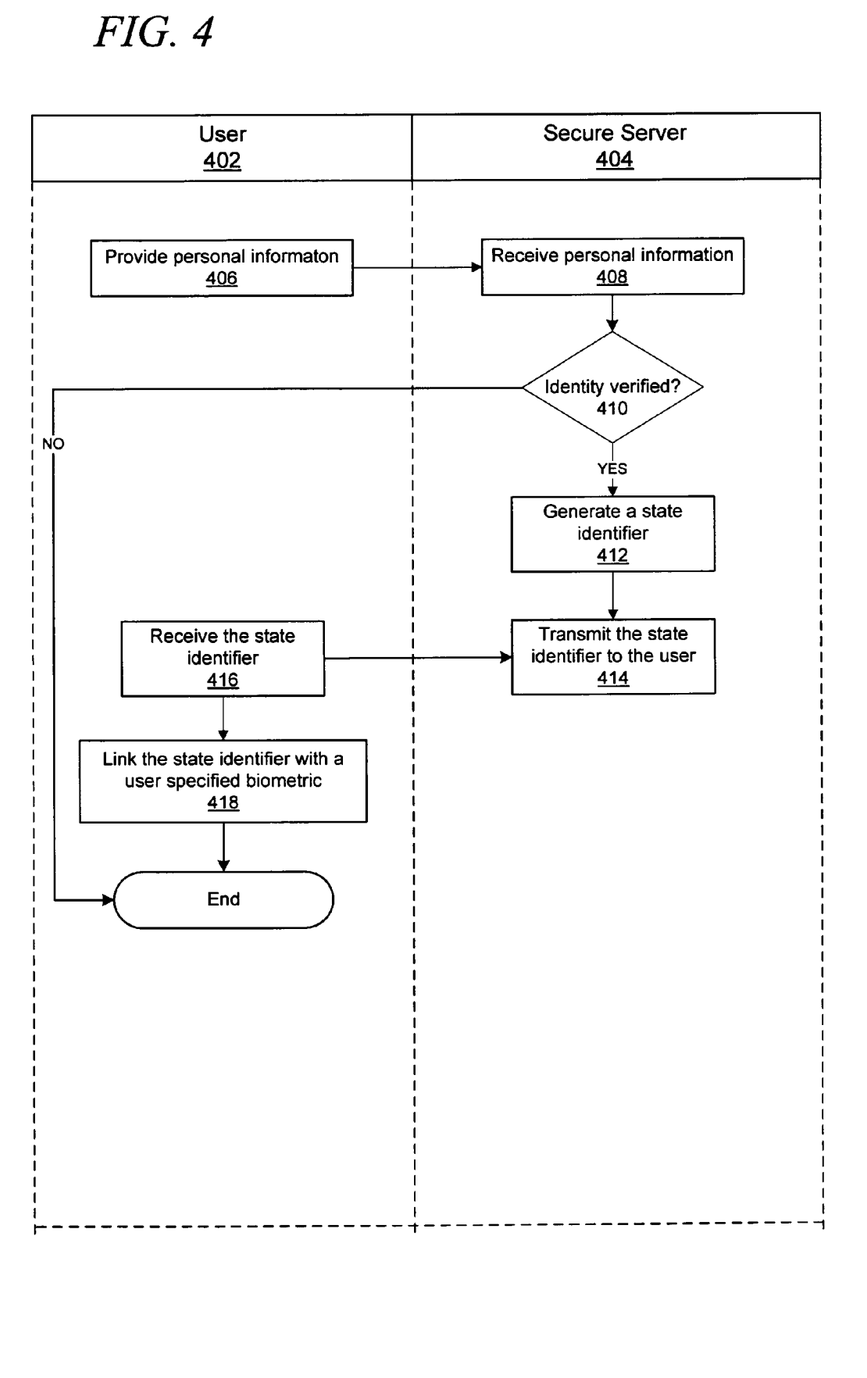
FIG. 4 is a flowchart of a process for receiving a state identification in accordance with an illustrative embodiment.

FIG. 4 is a flowchart of a process for receiving a state identification in accordance with an illustrative embodiment. The process of FIG. 4 may be a user 402 using a wireless device and/or a secure interface and a secure server 404. The process may begin with the user 402 providing personal information (step 406). In one embodiment, the user may provide the personal information or user information through a secure interface or graphical user interface enabled for communicating information. The personal information may include a hard copy of a driver's license, a birth certificate, passport, proof of insurance, or other information commonly used to verify the identity of the user. In another embodiment, the user 402 may enter the information using a traditional computing system and peripherals. The personal information may also be scanned or entered by another third party charged with receiving and verifying information about the user 402.

Next, the secure server 404 receives the personal information (step 408). The personal information may be transferred from the user 402 to the secure server 404 through a secure communications connection. The connection may be a hardwired or wireless connection. The secure server 404 determines whether the identity is verified (step 410). The determination of step 410 may be based on automatic or manual input. In one embodiment, the secure server 404 uses internal or external programs, applications, information, systems, and databases to verify the personal information. In another embodiment, the secure server 404 receives manual feedback from an individual authorized to verify information that indicates the determination. Step 410 may be performed by the secure server or by a person authorized to perform the verification, such as a government employee or other authorized individual. If the identity is not verified, the process ends.

If the identity is verified in step 410, the secure server 404 generates a state identifier (step 412). The state identifier may have a pre-defined format ensuring that each user receives a uniformly formatted electronic identification. The state identifier may be a file, program, field, instructions, or other data. Next, the secure server 404 transmits the state identifier to the user (step 414). The state identification may be transmitted wirelessly from the secure server 404 to the user's wireless device. Alternatively, the user may be required to establish a hard connection between the secure server 404 and the user 402 in order to transmit the state identification. Any number of different transmission techniques may be used to transmit the state identifier to the user in step 414.

The user 402 receives the state identifier (step 416) and links the state identifier with a user specified biometric (step 418). The user may be required to associate the state identifier with the biometric once the state identifier is received. For example, the user may provide a thumb print for fingerprint scanning, a spoken sentence for voice identification, or a small sample of tissue for a DNA analysis. As a result, anytime the user seeks to retrieve or use the state identification, the user may be required to first provide the biometric linked to the state identifier read from a biometric reader of the wireless device.

Figure 5:
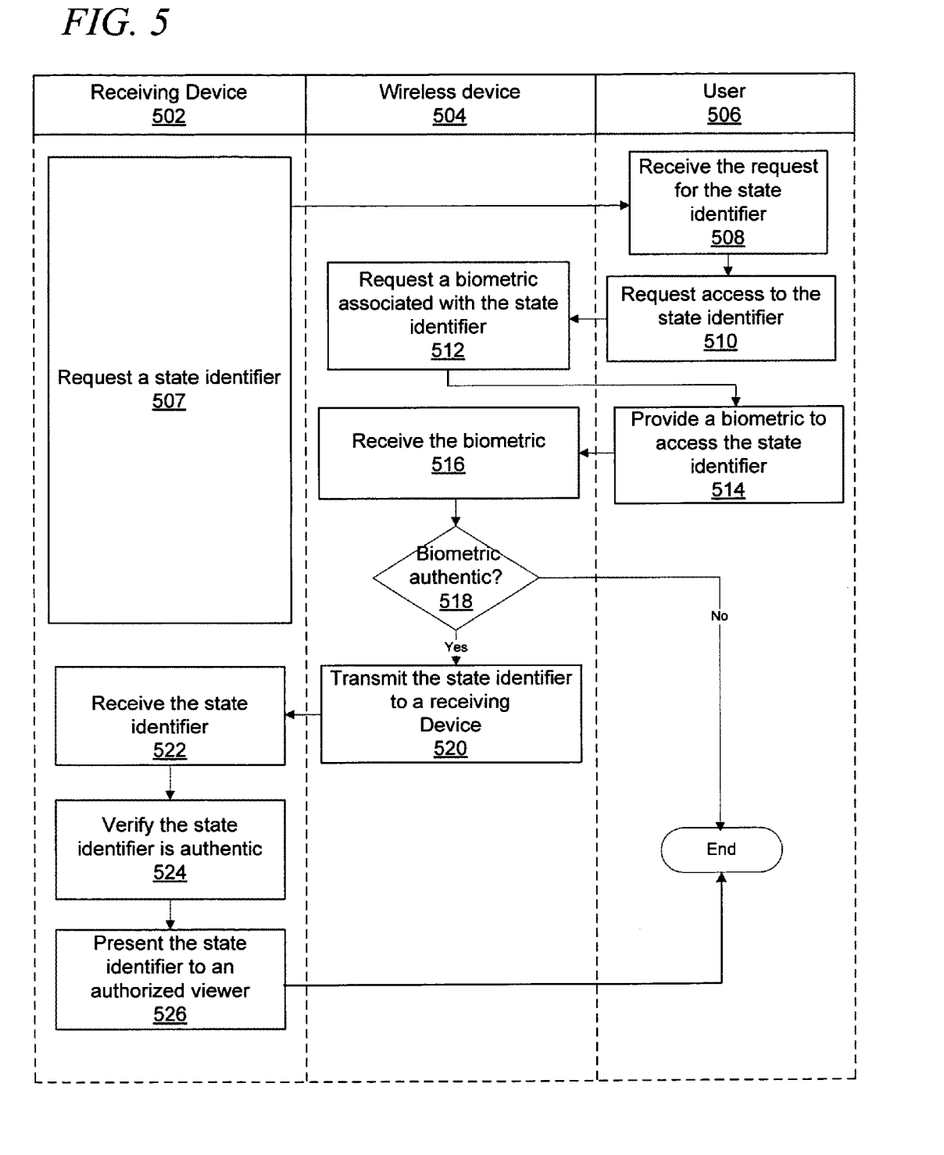
FIG. 5 is a flowchart of a process for processing a state identification in accordance with an illustrative embodiment.

FIG. 5 is a flowchart of a process for processing a state identification in accordance with an illustrative embodiment. The process of FIG. 5 may be implemented by a receiving device 502, a wireless device 504, and a user 506, and may be particularly applicable to an authentication environment.

The process may begin with the receiving device 502 requesting a state identifier (step 507). The request may be given verbally or electronically transmitted. In one embodiment, the request may pop up on the user's cell phone. The user 506 receives the request for the state identifier (step 508). The request may be received through a verbal cue or by other feedback from an authorized user with access to the receiving device 502. The request may also be received by the wireless device 504 and may be displayed to the user 506 in the form of a message or other notice displayed on or sent to the wireless device 504.

Next, the user 506 requests access to the state identifier (step 510). The user may request access by selecting the state identifier, entering a password, voice command, or providing other feedback to the wireless device 504. Next, the wireless device 504 requests a biometric associated with the state identifier (step 512). The biometric is requested based on the request transmitted to the user 506 through the wireless device 504. The user 506 provides a biometric to access the state identifier (step 514). The wireless device 504 may be equipped with a biometric reader or scanner integrated with the standard functionality of the wireless device 504.

As previously discussed, the biometric may be a fingerprint, DNA sample, iris scan, hand scan, voice identification, odor detection, or other biometric indicator. Next, the wireless device 504 receives the biometric (step 516). The wireless device 504 determines whether the biometric is authentic (step 518). The biometric is authentic if it matches the biometric previously linked or associated with the state identifier. If the wireless device determines the biometric is not authentic in step 518, the process ends. If the biometric is authenticated in step 518, the wireless device 504 transmits the state identifier to a receiving device (step 520).

Next, the receiving device 502 receives the state identifier (step 522). The state identifier may be wirelessly transmitted from the wireless device 504 to the receiving device 502. In one example, the receiving device 502 may be required to provide an identifier before the wireless device 504 transmits the state identifier to the receiving device 502. The receiving device 502 may also be required to decrypt or otherwise decode the state identifier provided by the user 506. The receiving device 502 authenticates the state identifier (step 524). The verification may include accessing databases and other information to verify the information included with the state identifier. For example, the user 506 may have a number of vehicles registered in his or her name that may be verified through state databases during the process of step 524.

The receiving device 502 presents the state identifier to an authorized viewer (step 526). The authorized viewer may be a government official, law enforcement official, or other individual that is authorized to make a request and view state identifiers. The state identifier may be presented through a graphical user interface, voice interface, or other interface used by the receiving device 502 to display or output information to the authorized viewer.

The previous detailed description is of a small number of embodiments for implementing the invention and is not intended to be limiting in scope. The following claims set forth a number of the embodiments of the invention disclosed with greater particularity.

What is claimed:

1. A method for processing a state identifier, the method comprising:
   receiving a request, through a cell phone that is associated with a user and from a receiving device separate from the cell phone, for the state identifier of the user, wherein the state identifier represents the actual identity of the user and comprises a form of identification in itself that is generated on a secure server by a local or federal government agency and transmitted to the cell phone wirelessly from the secure server, the state identifier including contact information of the user, wherein the cell phone displays the request for the state identifier to the user, wherein the receiving device comprises at least part of a law enforcement vehicle, and wherein the request includes a law enforcement identifier establishing that the request is authorized by the law enforcement vehicle;
   requesting a biometric associated with the state identifier from the user for receipt through a biometric reader of the wireless device that is associated with the user, the wireless device displaying the request for the biometric to the user;
   verifying, using the biometric reader of the cell phone that is associated with the user, authenticity of the biometric in response to receiving the biometric from the user, by determining whether the biometric is from an authorized user of the cell phone; and
   transmitting the state identifier, from the cell phone that is associated with the user to the receiving device in response to determining the biometric is authentic.

2. The method according to claim 1, wherein the request is received wirelessly from an electronic device associated with a state official or federal official.

3. The method according to claim 1, wherein transmitting further comprises:
   establishing a secure wireless connection between the wireless device that is associated with the user and the receiving device.

4. The method according to claim 1, wherein the request includes an identifier of the receiving device.

5. The method according to claim 1, further comprising:
   receiving the state identifier by the receiving device;
   verifying the state identifier is authentic; and
   presenting the state identifier to an official.

6. The method according to claim 1, wherein the biometric is a fingerprint.

7. The method according to claim 1, wherein the biometric is any of a retinal scan, DNA verification, voice recognition, facial identifier, odor, and hand geometry.

8. The method according to claim 1, wherein the state identifier is encrypted.

9. The method according to claim 1, wherein the state identifier includes a picture and personal information.

10. A system for receiving a state identifier, the system comprising:
    a server configured to wirelessly request the state identifier from a cell phone, the cell phone associated with a user and separate from the server, and receive the state identifier from the cell phone associated with the user, wherein the state identifier represents the actual identity of the user, comprises a form of identification in itself that is generated on a secure server by a local or federal government agency and transmitted to the cell phone wirelessly from the secure server, and is linked with a user biometric and the state identifier is released for communication to the server in response to receiving the user biometric from the user and verifying the user biometric, wherein the state identifier includes contact information of the user,
    wherein the server is in communication with a law enforcement vehicle configured to relay a request to the cell phone, wherein the request includes a law enforcement identifier establishing that the request is authorized by the law enforcement vehicle; and
    a database in communication with the server, the database is configured to verify (1) the state identifier is authentic and (2) information associated with the state identifier.

11. The system according to claim 10, wherein the server communicates with a wireless device of the user using a secure connection.

12. The system according to claim 10, wherein the server decrypts the state identifier based on a key received through a secure connection.

13. The system according to claim 10, wherein the state identifier is stored in an electronic file.

14. The system according to claim 10, wherein the information comprises a criminal record of the user.

15. A cell phone configured to utilize a state identifier comprising:
    a memory for storing the set of instructions;
    a processor for executing the set of instructions that when executed causes the processor to:
      receive, from a secure server, a state identifier, wherein the state identifier is generated on the secure server by a local or federal government agency;
      receive a request for the state identifier of a user from a receiving device separate from the wireless device,
      display the request for the state identifier to the user,
      request a biometric associated with the state identifier from the user through a biometric reader of the wireless device, wherein said wireless device is associated with the user, wherein the request for the biometric is displayed to the user by the wireless device,
      verify authenticity of the biometric in response to receiving the biometric from the user via the biometric reader, and
      transmit the state identifier to the receiving device in response to (1) verifying the biometric is authentic and (2) receiving a verified request for the state identifier from the receiving device, wherein the state identifier represents the actual identity of the user comprises a form of identification in itself,
wherein the state identifier includes contact information of the user, wherein the receiving device comprises at least part of a law enforcement vehicle, wherein the request includes a law enforcement identifier establishing that the request is authorized by the law enforcement vehicle.

16. The wireless device according to claim 15, further comprising:
establishing a secure connection with the receiving device for transmitting the state identifier.

17. The wireless device according to claim 15, wherein the state identifier includes a picture and personal information in an encrypted format.

18. The wireless device according to claim 15, wherein the biometric reader is a fingerprint scanner for verifying the biometric, and wherein the biometric is a fingerprint.

19. The wireless device according to claim 15, wherein the verified request includes a time stamp, and wherein the state identifier must be sent during a time period prior to expiry of the time stamp.

* * * * *